United States Patent
Kashiwagi et al.

(10) Patent No.: US 8,411,181 B2
(45) Date of Patent: Apr. 2, 2013

(54) IMAGE PICK-UP APPARATUS FOR CONTROLLING GENERATION OF AN ELECTRONIC SHUTTER PULSE SIGNAL BASED ON ONE OF A DETECTED BRIGHTNESS OF AN IMAGING OBJECT AND AN OBTAINED CURRENT EXPOSURE VALUE, AND METHOD AND NON-TRANSITORY COMPUTER READABLE RECORDING MEDIUM THEREFOR

(75) Inventors: Motoyuki Kashiwagi, Kodaira (JP); Takashi Itoh, Hamura (JP); Hiroyuki Nakata, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 249 days.

(21) Appl. No.: 12/880,408

(22) Filed: Sep. 13, 2010

(65) Prior Publication Data
US 2011/0063475 A1    Mar. 17, 2011

(30) Foreign Application Priority Data
Sep. 14, 2009   (JP) .................................. 2009-211632

(51) Int. Cl.
*H04N 3/14*    (2006.01)
*H04N 5/335*    (2011.01)

(52) U.S. Cl. ........................................ 348/296; 348/312
(58) Field of Classification Search ............... 348/229.1, 348/282, 296, 311–324, 333.01; 257/222, 257/225–234; 250/208.1; 358/483; 377/57–63
See application file for complete search history.

(56) References Cited

U.S. PATENT DOCUMENTS

| | | | |
|---|---|---|---|
| 2004/0141082 A1 * | 7/2004 | Nakahira | 348/333.01 |
| 2011/0058080 A1 * | 3/2011 | Egawa | 348/296 |

FOREIGN PATENT DOCUMENTS

| | | |
|---|---|---|
| JP | 2004-023208 A | 1/2004 |
| JP | 2006-174024 A | 6/2006 |
| JP | 2007-295628 A | 11/2007 |

* cited by examiner

*Primary Examiner* — Nelson D. Hernández Hernández
*Assistant Examiner* — Dennis Hogue
(74) *Attorney, Agent, or Firm* — Holtz, Holtz, Goodman & Chick, P.C.

(57) ABSTRACT

The digital still camera 1 has CCD 33 with an electronic shutter for controlling an exposure amount, and a timing generator 34 and a vertical/horizontal driver 35 for driving CCD 33. Under control of a controlling unit 42, the timing generator 34 and a vertical/horizontal driver 35 generate an electronic shutter pulse signal once every time plural periods have come each for reading charge of one line from CCD 33. Power consumption can be reduced in controlling exposure using the electronic shutter.

8 Claims, 8 Drawing Sheets

IMAGE PICK-UP APPARATUS FOR CONTROLLING GENERATION OF AN ELECTRONIC SHUTTER PULSE SIGNAL BASED ON ONE OF A DETECTED BRIGHTNESS OF AN IMAGING OBJECT AND AN OBTAINED CURRENT EXPOSURE VALUE, AND METHOD AND NON-TRANSITORY COMPUTER READABLE RECORDING MEDIUM THEREFOR

BACKGROUND OF THE INVENTION

1. Field of the Invention

The present invention relates to an image pick-up apparatus and a computer readable recording medium storing a computer program for the apparatus.

2. Description of the Related Art

In conventional image pick-up apparatuses for picking up digital images, a technique is known for preventing increasing power consumption in a shutter operation for picking up an image with smear suppressed. For example, such technique is disclosed in Patent Document 1 (Japanese Patent No. 2007-295628 A).

The image pick-up apparatus disclosed in the Patent Document 1 controls exposure using a mechanical shutter to obtain a digital image, when a level of a smear is higher than a predetermined threshold level, wherein the smear is caused based on charge which is accumulated in CCD in accordance with incident light on a light receiving plane of the CCD. Meanwhile, when the level of the smear is not higher than the predetermined threshold level, the image pick-up apparatus controls exposure using an electronic shutter to obtain a digital image. The image pick-up apparatus having both the mechanical shutter and electronic shutter can reduce power consumption in driving the mechanical shutter.

But the conventional image pick-up apparatus disclosed in the Patent Document 1 controls exposure using the electronic shutter, when the level of smear is not higher than the predetermined threshold level. The Patent Document 1 discloses nothing about reducing power consumed when the electronic shutter is operated. In the conventional image pick-up apparatus, the electronic shutter is used more frequently than the mechanical shutter. Although the power consumption in the shutter operation is reduced, the power consumption in the electronic shutter operation cannot be reduced.

SUMMARY OF THE INVENTION

According to one aspect of the invention, there is provided an image pick-up apparatus, which comprises an image pick-up element for picking up an image, an exposure amount to the image pick-up element being controlled by an electronic shutter operation, a driving signal generating unit for generating an electronic shutter pulse signal for driving the image pick-up element, and a controlling unit for controlling the driving signal generating unit, wherein the controlling unit controls the driving signal generating unit to generate an electronic shutter pulse signal once every time plural periods have come, each for reading charge of one line from the image pick-up element.

According to another aspect of the invention, therein provided a computer readable recording medium mounted on an image pick-up apparatus, wherein the image pick-up apparatus is provided with a built-in computer and an image pick-up element, an exposure amount to which is controlled by an electronic shutter operation, the computer readable recording medium having recorded thereon a computer program when executed to make the built-in computer execute a process including generation of an electronic shutter pulse signal once every time plural periods have come each for reading charge of one line from the image pick-up element in a drive pulse generating process for driving the image pick-up element.

DETAILED DESCRIPTION OF THE PREFERRED EMBODIMENTS

Now, embodiments of the present invention will be described in detail with reference to the accompanying drawings.

A whole configuration of a digital still camera 1 according to an embodiment of the invention will be described with reference to FIGS. 1A and 1B.

Figure 1A:
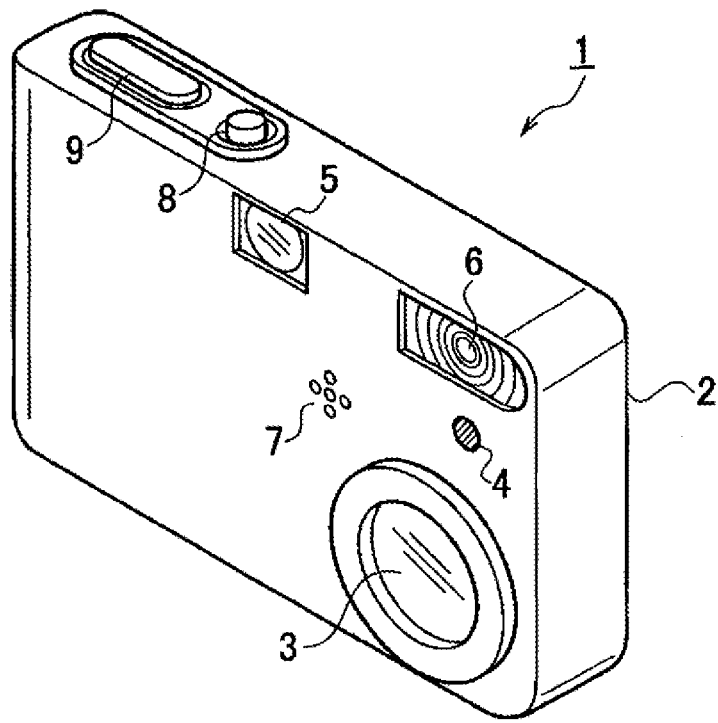
FIGS. 1A and 1B are perspective views illustrating a digital still camera according to an embodiment of the present invention.

As illustrated in FIG. 1A, the digital still camera 1 has a substantially flat rectangle-shaped body 2. On a front surface of the rectangle-shaped body 2, the digital still camera 1 is provided with a shooting lens 3, a self-timer lump 4, a finder window 5, a strobe light emitting unit 6, and a microphone unit 7. On a top of the rectangle-shaped body 2, the camera 1 is provided with a shutter key 9 and a power source key 8 next to the shutter key 9.

The shooting lens 3 has a zooming function, which changes a focusing distance continuously not in a stepwise fashion, and an auto focusing function. The shooting lens 3 is housed within the body 2 when the power is turned off or when a reproducing mode is set. The power source key 8 is operated to turn on or off the power. The shutter key 9 is operated half way or full way in a shooting mode to instruct a timing of shooting a picture.

Figure 1B:
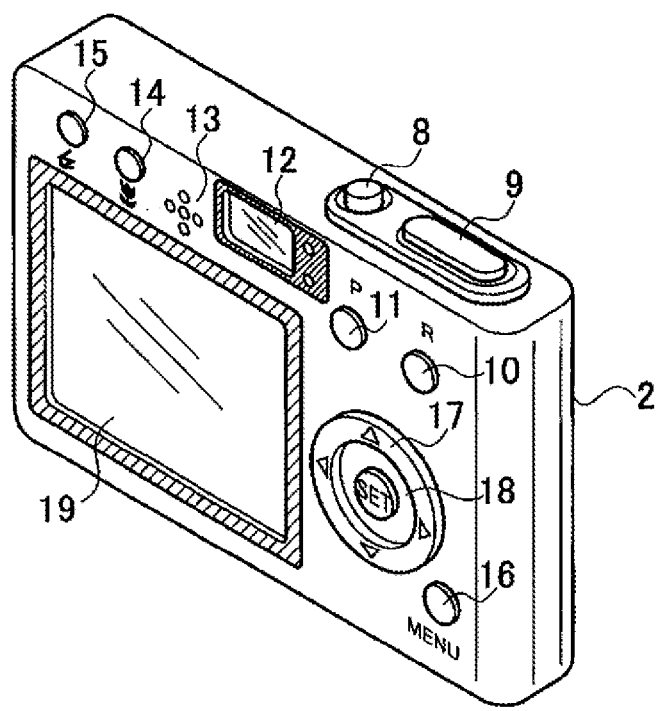

On a rear surface of the rectangle-shaped body 2, the digital still camera 1 is provided with a shooting mode (R) key 10, a reproducing mode (P) key 11, an electronic view finder (EVF) 12, a speaker unit 13, a macro key 14, a strobe key 15, a menu (MENU) key 16, a ring key 17, a set (SET) key 18 and a liquid crystal displaying unit 19, as illustrated in FIG. 1B.

The shooting mode key 10 serves to turn on the power and automatically set a still image shooting mode, when said shooting mode key 10 is operated while the power is turned off. Meanwhile, the shooting mode key 10 serves to switch the still image shooting mode to a moving image shooting mode and vice versa, when said shooting mode key 10 is repeatedly operated while the power is kept turned on.

The reproducing mode key 11 serves to turn on the power and automatically set the reproducing mode, when said reproducing mode key 11 is operated while the power is kept turned off. EVF 12 is used as an eyepiece-type finder by a user. EVE 12 displays a live view on a liquid crystal display screen in the shooting mode. Meanwhile, EVF 12 displays a selected image on the liquid crystal display screen in the reproducing mode. The macro key 14 is operated in the still image shooting mode to switch a normal shooting operation to a macro shooting operation. The strobe key 15 is operated to switch a light emitting mode of the strobe light emitting unit 6. The menu key 16 is operated to select a menu item among various sorts of menu items. The ring key 17 includes an up key, a down key, a leftward key and a rightward key for selecting an item. The set key 17 is provided at the center of the ring key 17 and is operated to set an item which is selected at the time when said set key 17 is operated.

The liquid crystal displaying unit 19 comprises a color liquid crystal displaying panel with a back light panel attached. The liquid crystal displaying unit 19 displays a live image in the shooting mode for a monitoring purpose. Meanwhile, the liquid crystal displaying unit 19 displays a selected image in the reproducing mode. Although not shown in FIGS. 1A and 1B, the digital still camera 1 is provided with a memory card slot for receiving a memory card (recording medium) and an USB (Universal Serial Bus), that is, a serial interface connector, which serves to connect the camera 1 with an external personal computer.

Figure 2:
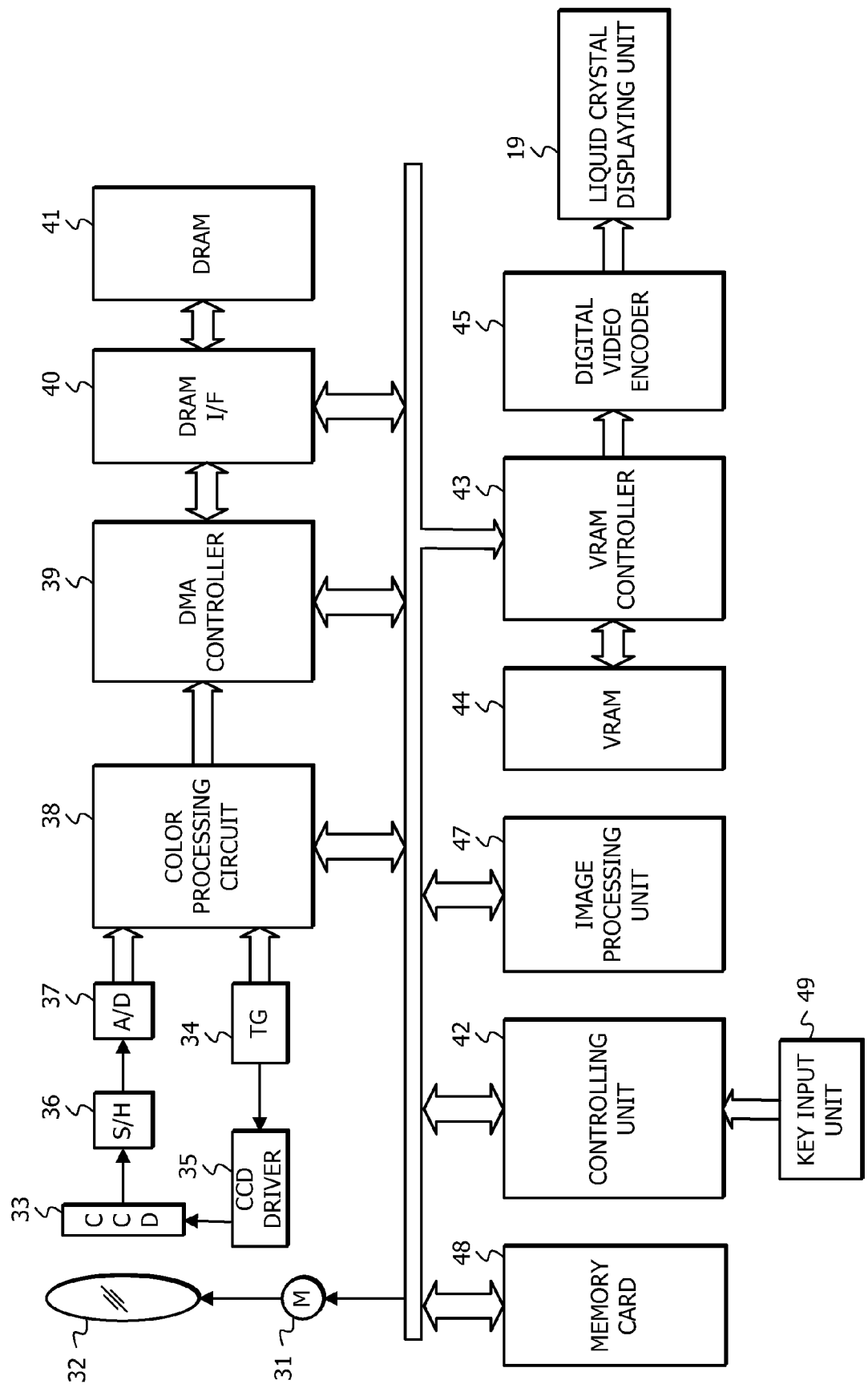
FIG. 2 is a view showing a configuration of a shooting and controlling system in the digital still camera according the embodiment of the invention.

FIG. 2 is a view showing a configuration of a shooting and controlling system in the digital still camera 1 according the embodiment of the invention. The configuration of the shooting and controlling system in the digital still camera 1 will be described with reference to FIG. 2.

In the digital still camera 1 according the embodiment of the invention, the shooting lens 3 is moved by an electric motor (M) 31 in the shooting mode, whereby a focusing position and aperture position are changed. An image pick-up element, that is, CCD (Charge Coupled Device) 33 is disposed behind the shooting lens 3 forming an optical system 32. The CCD 33 is scanned by a timing generator (TG) 34 and a vertical/horizontal driver 35. The vertical/horizontal driver 35 generates a CCD driving pulse signal in response to a vertical CCD drive timing signal and a horizontal CCD drive timing signal and an electronic shutter timing signal SUB generated by the timing generator 34, and supplies the CCD driving pulse signal to the CCD 33 to drive the same.

The CCD 33 operates in accordance with the CCD drive pulse signal generated by the vertical/horizontal driver 35. The CCD 33 supplies an optical converting signal (analog signal) of one frame corresponding to an optical image focused thereon every certain period in accordance with a vertical CCD drive timing signal VD supplied from the vertical/horizontal driver 35. RGB components of the optical converting signal are subjected to a gain adjustment. Then, the optical converting signal (analog signal) is sample-held at a sample/hold (S/H) circuit 36 and converted into digital data by A/D converter 37. The digital data is subjected to a color processing, which includes a pixel interpolating process and a gamma correcting process by a color processing circuit 38, whereby image data consisting of a luminance signal "Y" and color difference signals "Cb", "Cr" is obtained. The image data is supplied to DMA (Direct Memory Access) controller 39. As described above, the digital still camera 1 performs a shooting process to obtain image data.

In the shooting process, an exposure amount of CCD 33 is controlled by operation of the electronic shutter. CCD 33 has a pixel unit including photosensitive pixels, which receive light, generating electric charge. The electronic shutter operates to allow the charge accumulated in all the photosensitive pixels in the pixel unit of CCD 33 to discharge through a substrate in semiconductor within CCD 33 to the earth. The electronic shutter timing signal SUB is a signal, which indicates a timing at which the charge is discharged in response to the operation of the electronic shutter. The exposure amount of CCD 33 is controlled by a drive pulse generating unit, which comprises the timing generator 34 and the vertical/horizontal driver 35. The timing generator 34 and the vertical/horizontal driver 35 generate an electronic shutter pulse signal once under control of a controlling unit 42 every time plural periods have come each for reading charge of one line from CCD 33. The operation of the timing generator 34 and the vertical/horizontal driver 35 corresponds to the second operation mode to be described later.

The timing generator 34 and the vertical/horizontal driver 35 can selectively operate in the first operation mode or in the second operation mode, wherein in the first operation mode, the period of reading charge of one line from CCD 33 is synchronized with a generation frequency of the electronic shutter pulse signal under control of the controlling unit 42, and in the second operation mode, the electronic shutter pulse signal is generated once under control of the controlling unit 42 every time plural periods each for reading charge of one line from CCD 33 have come. The controlling unit 42 controls the exposure amount of CCD 33 in the selected operation mode, thereby obtaining image data. Hereinafter, the digital still camera 1 will be described, in which the first or the second operation mode is selected by the controlling unit 42.

A judging process for the timing generator 34 and the vertical/horizontal driver 35 to select one of the operation modes is performed by the controlling unit 42. The controlling unit 42 measures brightness of an object to be shot with the digital still camera 1, and performs AE (Automatic Exposure) process to determine exposure (combination of an aperture value and a shutter speed). In measuring the brightness of the object, the controlling unit 42 uses image data to measure incident light onto CCD 33, which comes through the optical lens system 32. To measure the brightness of the object, the digital still camera 1 employs one of a spot-light measuring system, a center-light measuring system and a multi-pattern light measuring system. As the brightness of the object can be used an exposure value (EV), a pixel value of pixels composing, an image, and a luminance value.

In the case that it is determined that the brightness of the object is high to some extent, the controlling unit 42 controls the exposure amount of CCD 33 in the first operation mode. In the case that it is determined that the brightness of the object is low, the controlling unit 42 controls the exposure amount of CCD 33 in the second operation mode. As described, the controlling unit 42 selects the second operation mode, in which the generation frequency of the electronic shutter pulse signal is lower than in the first operation mode, reducing power consumption in electronic shutter operation in the case that the brightness of the object is low.

DMA controller 39 receives image data including luminance signal "Y" and the color difference signals "Cb", "Cr" from the color processing circuit 38, and temporarily writes the received image data in a buffer of DMA controller 39 in accordance with a composite synchronizing signal, a write enable signal and a clock signal sent from the color processing circuit 38. DMA controller 39 transfers the image data directly to DRAM 41 through DRAM interface (Dynamic Random Access Memory interface) 40.

The controlling unit 42 comprises CPU (Central Processing Unit), ROM (Read Only Memory) and RAM (Random Access Memory), wherein ROM stores a computer program which is run by a computer, and RAM is used as a work memory. The controlling unit 42 controls the whole operation of the digital still camera 1 in addition to controlling of the exposure value of CCD 33.

After transferring the image data to DRAM 41, the controlling unit 42 reads said image data from DRAM 41 through DRAM interface 40 and writes the same image data onto VRAM 44 through VRAM controller (Video Random Access Memory controller) 43. A digital video encoder 45 periodically reads the image data from the VRAM 44 through VRAM controller 43, and produces a video signal from the image data, and supplies the video signal to EVF 12 and the liquid crystal displaying unit 19. EVF 12 and the liquid crystal displaying unit 19 display the received video signal, whereby EVF 12 and the liquid crystal displaying unit 19 display a live image based on the image data currently obtained from the VRAM controller 43.

As described, an image currently shot is displayed as a monitor image on EVF 12 and the liquid crystal displaying unit 19 in real time. When the shutter key 9 is pressed half way or full way with a live image displayed, a trigger signal is generated. In response to the trigger signal, the controlling unit 42 stops transferring to DRAM 41 the luminance signal and color difference signals of one frame currently obtained from CCD 33. Then, the controlling unit 42 drives CCD 33 under appropriate exposure conditions (aperture and shutter speed) to obtain a luminance signal and color difference signals of one frame, and transfers the obtained signals to DRAM 41. Thereafter, the controlling unit 42 keeps the route from CCD 33 to DRAM 41 away from operation and moves to a recording operation.

In the recording operation, the controlling unit 42 reads the luminance signal "Y" and the color difference signals "Cb", "Cr" from DRAM 41 through DRAM interface 40 and writes each of the signal components "Y", "Cb" and "Cr" to an image processing unit 47. The image processing unit 47 executes ADCT (Adaptive Discrete Cosine Transform) Huffman Coding on each of the signal components to compress them, wherein Huffman Coding is an entropy encoding system used for data compression. The controlling unit 42 reads the compressed data (code data) from the image processing unit 47 and writes the code data in a detachable memory card 48 or in a built-in memory (not shown) of the digital still camera 1. After executing the compressing process on the luminance signal "Y" and the color difference signals "Cb", "Cr" and writing the compressed data in the memory card 48 or in the built-in memory, the controlling unit 42 brings the route from CCD 33 to DRAM 41 into operation, again.

The controlling unit 42 is connected with a key input unit 49. The key input unit 49 comprises the power source key 8, the shutter key 9, the shooting mode key 10, the reproducing mode key 11, the macro key 14, the strobe key 15, the menu (MENU) key 16, the ring key 17, and the set key 18. A signal is generated in response to operation of these keys by a user, and supplied directly to the controlling unit 42.

Figure 3:
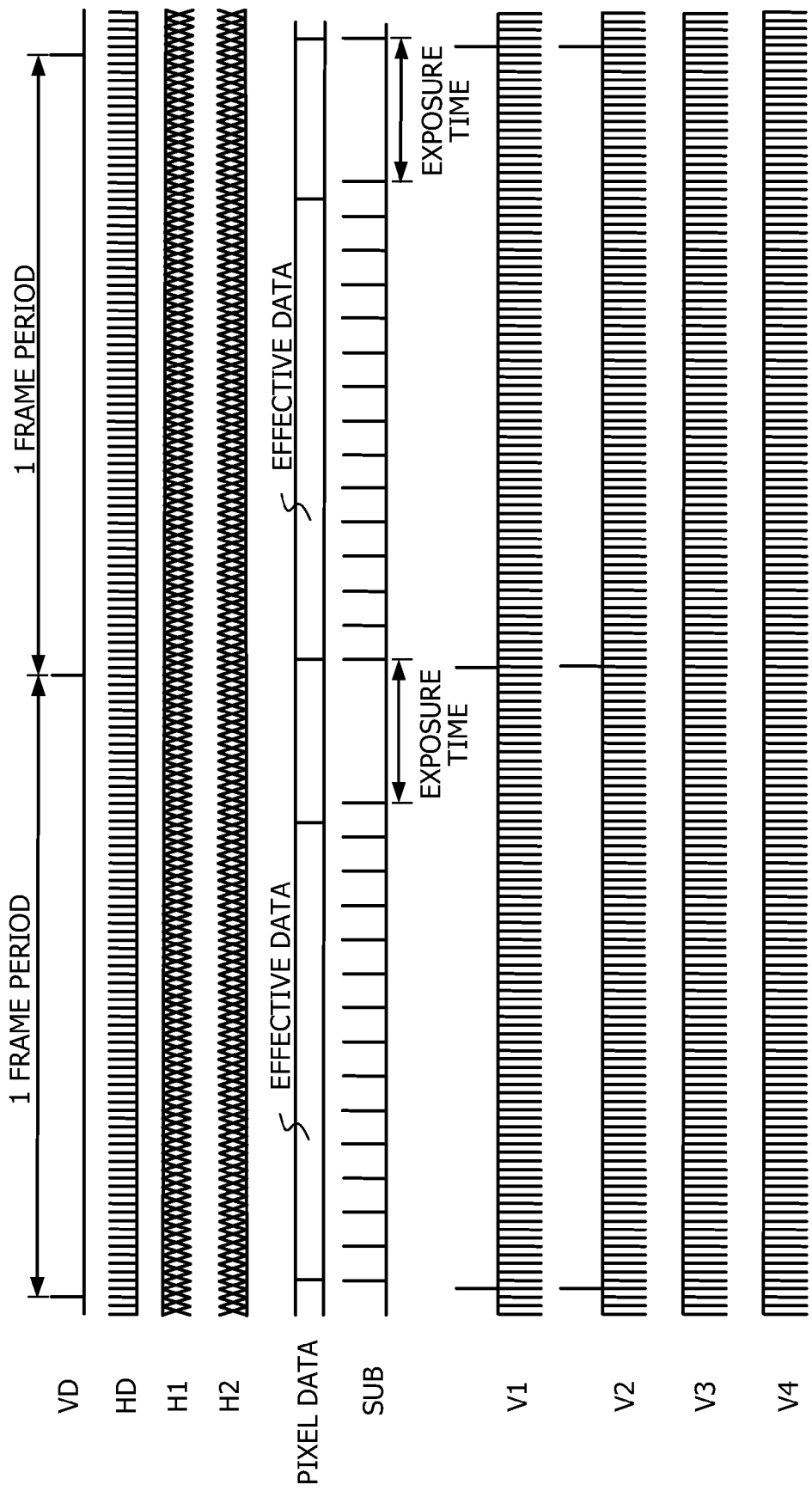
FIG. 3 is a time chart of waveforms driving CCD in the digital still camera when an object is shot under a little high light condition.
Figure 4:
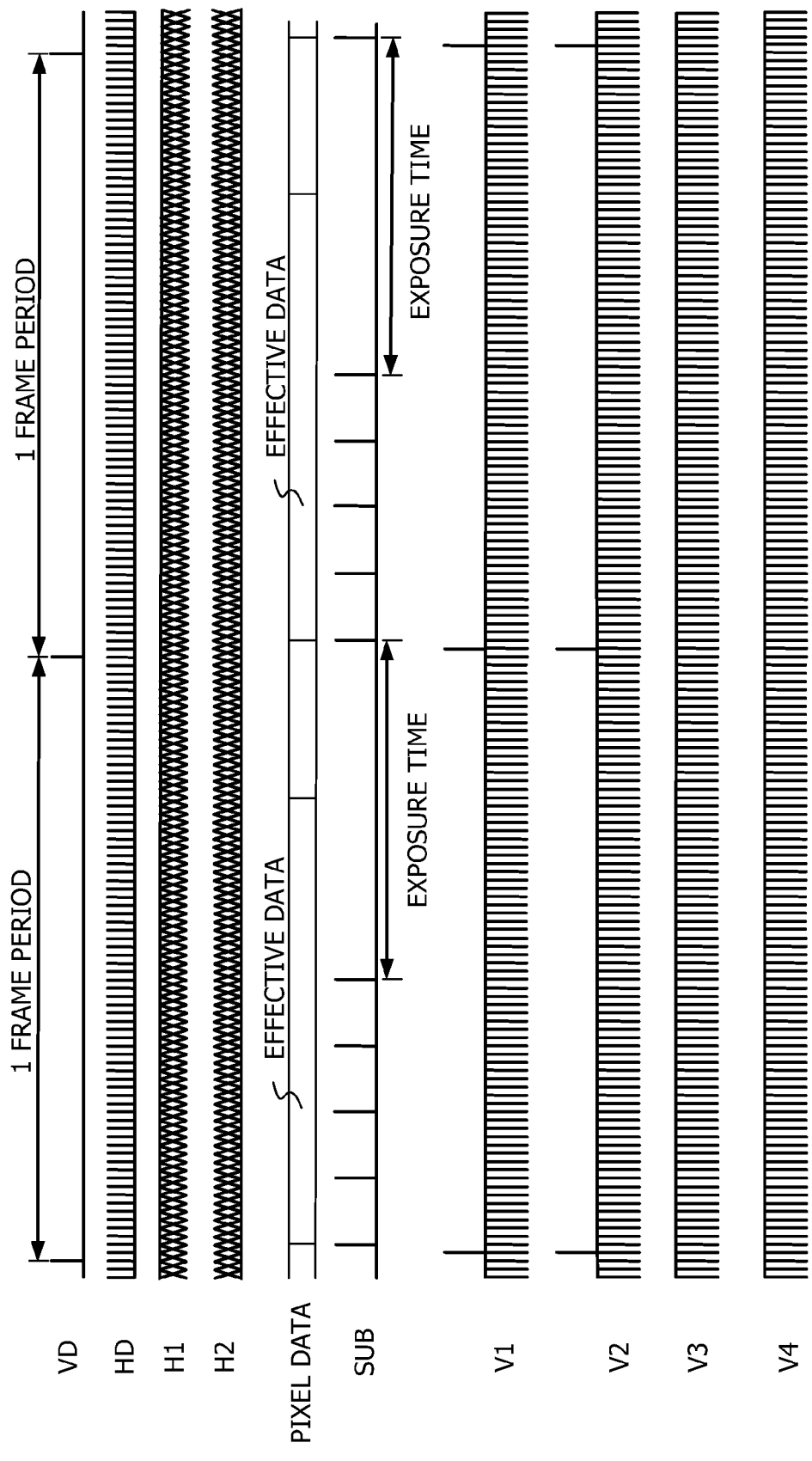
FIG. 4 is a time chart of waveforms driving CCD in the digital still camera when the object is shot under low light condition.

Operation of the digital still camera 1 of the above configuration when CCD 33 is driven will be described with reference to FIG. 3 and FIG. 4. FIG. 3 is a time chart of waveforms driving CCD 33 when an object is shot under a little high light condition. FIG. 4 is a time chart of waveforms driving CCD 33 when the object is shot under low light condition. "Shooting an object under a little high light condition" corresponds to shooting the object in a well-lighted room or on a cloudy day or shooting the object with the exposure value (EV) of "11 to 8". "Shooting the object under low light condition" corresponds to shooting the object in a dark room or shooting the object with the exposure value lower than "8".

In FIG. 3, VD indicates a vertical CCD drive timing signal for taking out from CCD 33 charge corresponding to one frame of a live image. HD indicates a horizontal CCD drive timing signal for taking out from CCD 33 charge corresponding to one line in the horizontal direction of CCD 33. During one vertical CCD drive timing signal VD, the horizontal CCD drive timing signals HD are generated as much as the number of lines of CCD 33. As shown in FIG. 3, the timing generator 34 and the vertical/horizontal driver 35 generate vertical transfer pulse signals V1 to V4. The vertical/horizontal driver 35 applies a read pulse signal to CCD 33, thereby reading charge from predetermined pixels to a vertical transferring path. CCD 33 uses effective data consisting of the accumulated charge taken out as described above to produce a live image.

A horizontal CCD drive timing signal H1 for taking out charge corresponding to even lines of a live image and a horizontal CCD drive timing signal H2 for taking out charge corresponding to odd lines of the live image are shown in FIG. 3. Image data is produced from the taken out charge, in which the number of lines corresponding to one frame of the live image are thinned out. The produced image data is stored as effective data in DRAM 41 through the color processing circuit 38.

The electronic shutter timing signal SUB is generated at the time when charge of one frame accumulated in CCD 33 is discharged within one frame period of the vertical CCD drive timing signal VD. The electronic shutter timing signal SUB is generated every predetermined time before an exposure time determined in AE process reaches. The electronic shutter timing signal SUB is not in synchronism with the horizontal CCD drive timing signal HD and is generated once every time plural vertical CCD drive timing signals HD are generated. The generation of the electronic shutter timing signal SUB corresponds to operation in the second operation mode.

As described above, the electronic shutter timing signal SUB allows CCD 33 to repeatedly discharge charge in a period longer than the horizontal CCD drive timing signal HD before the exposure time reaches within a period of one frame. Thereafter, when the beginning of the exposure time of the following frame has reached, the vertical/horizontal driver 35 stops generation of the electronic shutter timing signal SUB. When the exposure time for obtaining image data from CCD 33 has lapsed, the vertical/horizontal driver 35 starts generation of the vertical CCD drive timing signal VD, horizontal CCD drive timing signal HD and electronic shutter timing signal SUB, again.

As shown in FIG. 4, the exposure time will be long in the case that the object is shot under low light condition. This is because it is necessary to obtain a live image of the object which is light to some extent to shoot the object at a long exposure time. Similarly, the electronic shutter timing signal SUB is generated at a generation-cycle longer than that shown in FIG. 3. This is because charge takes a loner time to saturate in CCD 33 in the case that the object is shot under low light condition.

As described above, the digital still camera 1 controls the exposure amount of CCD 33 in the second operation mode depending on the brightness of the object in the case the object is shot not under so high light condition. Therefore, in the case the object is shot not under so high light condition, the controlling unit 42 selects the second operation mode rather than the first operation mode, wherein in the second operation mode the electronic shutter timing signal SUB is generated at the generation-cycle longer than in the first operation mode. As a result, the controlling unit 42 can reduce power consumption in the electronic shutter operation when the object is shot not under so high light condition.

Figure 5:
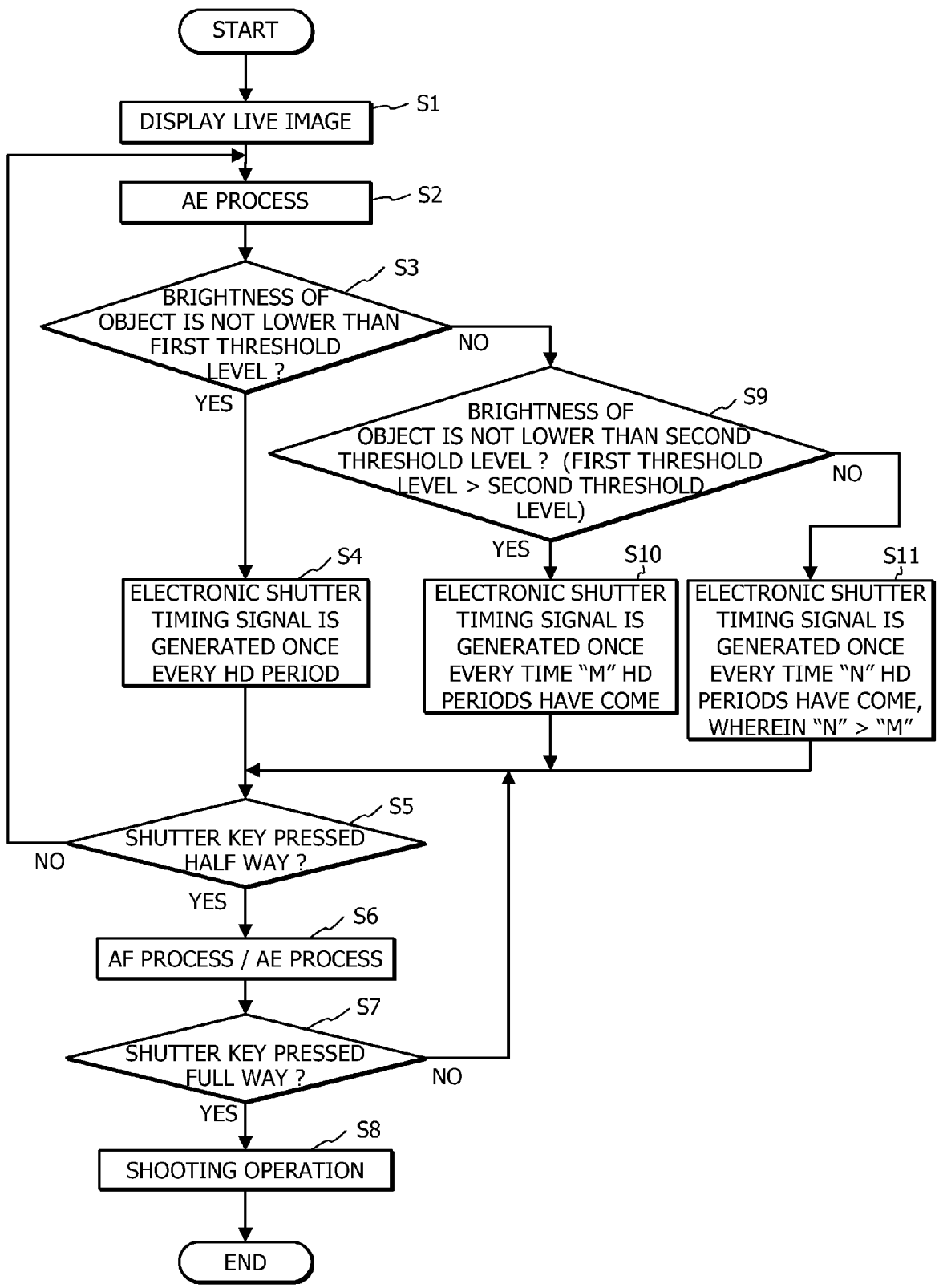
FIG. 5 is a flow chart showing a shooting operation performed by the digital still camera.

When the electronic shutter timing signals SUB are generated as shown in FIGS. 3 and 4, the controlling unit 42 operates in accordance with a flow chart shown in FIG. 5. FIG. 5 is a flow chart showing a shooting operation performed by the digital still camera 1. The computer program of the digital still camera 1 is stored in an internal ROM, and the controlling unit 42 runs the computer program in the shooting mode. The controlling unit 42 serves as an internal computer of the digital still camera 1 and runs the computer program, thereby controlling the timing of generation of the electronic shutter timing signal SUB.

The controlling 42 starts the shooting operation to obtain image data at step S1 in FIG. 5. The controlling unit 42 controls DMA controller 39 to display a live image of image data produced by the color processing circuit 38.

The controlling unit 42 performs AE process at step S2 to measure brightness of an object to be shot, determining an exposure time to shoot the object. The controlling unit 42 sets the exposure time longer as the image data produced by the color processing circuit 38 is darker.

The controlling unit 42 judges at step S3 whether or not the brightness of the object is not lower than a first threshold level. When the brightness of the object is not lower than the first threshold level (YES at step S3), the controlling unit 42 advances to step S4. When the brightness of the object is lower than the first threshold level (NO at step S3), the controlling unit 42 advances to step S9. For instance, an exposure value (EV) can be used to represent the brightness of the object and/or the first threshold level. The exposure value (EV) indicates an exposure amount. The exposure can be determined based on elements such as brightness of an object, sensitivity of CCD 33, aperture, and a shutter speed. The controlling unit 42 sets the first threshold level to the exposure value (EV) of "11", for example, at step S3. When the exposure value (EV) obtained at step S2 is not less than "11" (YES at step S3), the controlling unit 42 advances to step S4. When the exposure value (EV) obtained at step S2 is less than "11" (NO at step S3), the controlling unit 42 advances to step S9. The exposure value (EV) of "11" corresponds to the brightness of the object which is to be shot outside in a cloudy day. The exposure value is not restricted to the value of "11" but can be set to a value higher than "11" when the electronic shutter timing signal SUB is set to a lower generation frequency.

Figure 6:
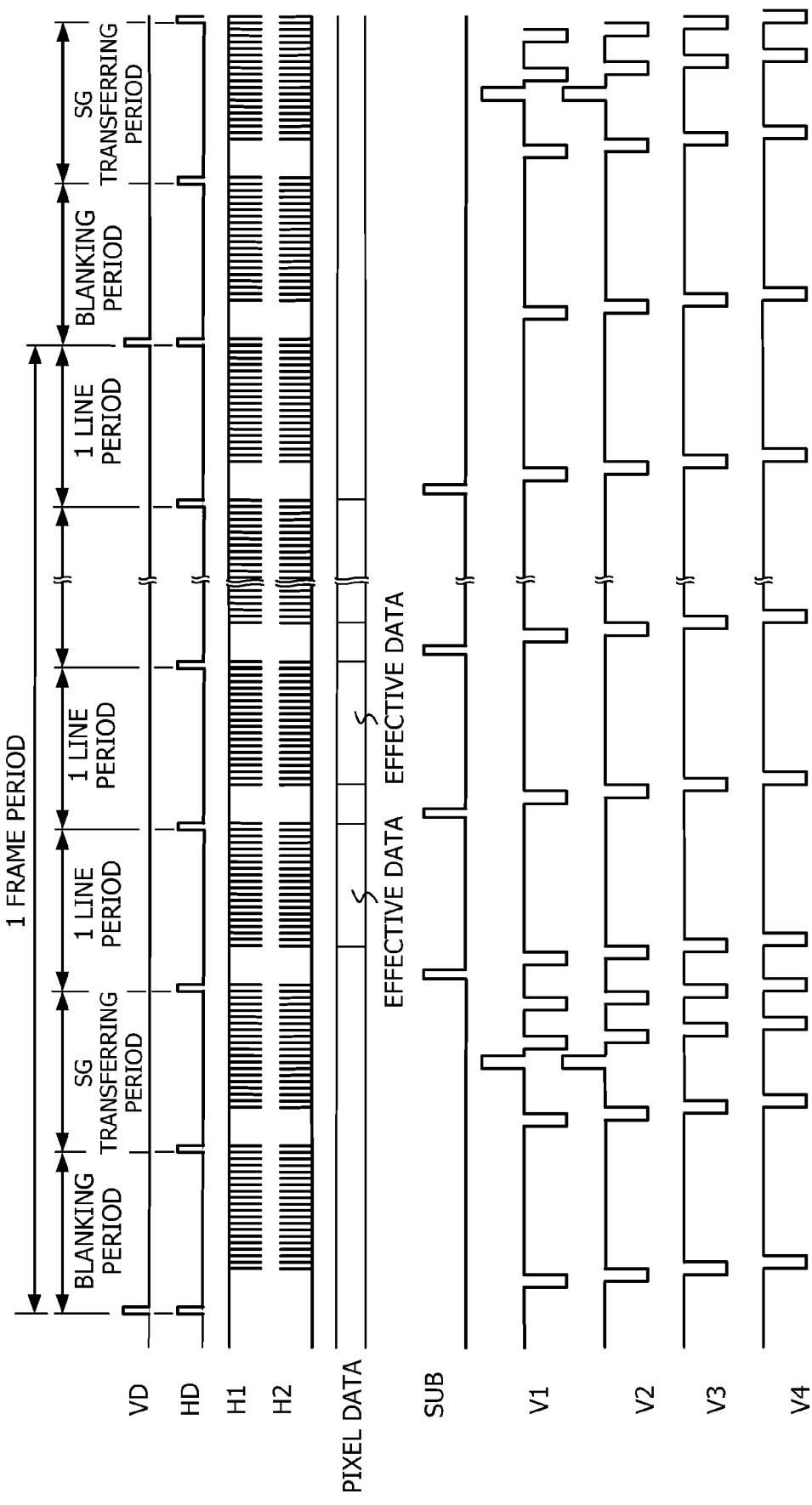
FIG. 6 is a time chart of waveforms driving CCD when a live image of effective data is displayed on the liquid crystal displaying unit in the digital still camera.

The controlling unit 42 selects the first operation mode, in which the electronic shutter timing signal SUB is output once every generation of the horizontal CCD drive timing signal HD. The first operation mode will be described with reference to FIG. 6. FIG. 6 is a time chart of waveforms driving CCD 33 while a live image of effective data is displayed on the liquid crystal displaying unit 19. In the first operation mode, the electronic shutter timing signal SUB is generated in synchronism with the horizontal CCD drive timing signal HD. In the first operation mode, an operation of one line period for reading charge of one line from CCD 33 is repeatedly performed after a blanking period of each frame and a SG transferring period of reading and transferring all the charge of CCD 33 to the transferring path. In the first operation mode, the electronic shutter timing signal SUB is not always generated in synchronism with the horizontal CCD drive timing signal HD.

In the first operation mode, the electronic shutter timing signal SUB is generated in synchronism with the horizontal CCD drive timing signal HD, thereby making the electronic shutter operate to secure not to saturate pixel value of CCD 33. But when the pixel value is not saturated in the first operation mode even if the object is shot under high light condition, the generation-cycle of the electronic shutter timing signal SUB can be made long.

The controlling unit 42 judges at step S5 whether or not the shutter key 9 of the key input unit 49 has been pressed half way. The judgment is made at step S5 based on whether or not the controlling unit has received a trigger signal from the shutter key 9. Receiving the trigger signal (YES at step S5), the controlling unit 42 advances to step S6. Receiving no trigger signal (NO at step S5), the controlling unit 42 returns to step S2.

When it is determined at step S5 that the shutter key 9 has been pressed half way (YES at step 5), the controlling unit 42 performs AF process and AE process at step S6.

The controlling unit 42 judges at step S7 whether or not the shutter key 9 of the key input unit 49 has been pressed full way. When the shutter key 9 has been pressed full way (YES at step S7), the controlling unit 42 advances to step S8. When the shutter key 9 has not been pressed full way (NO at step S7), the controlling unit 42 returns to step S5.

The controlling unit 42 performs the shooting operation in response to operation of the shutter key 9 by a user at step S8 to obtain and store image data in the memory card 48. In the shooting operation; the controlling unit 42 takes out the charge accumulated in CCD 33, producing image data in the sample hold circuit 36, A/D converter 37 and color processing circuit 38. The produced image data is supplied to the image processing unit 47 through DRAM interface 40. The image data is subjected to a predetermined process in the image data processing unit 47 and stored in the memory card 48.

As described above, when the object is under high light condition, the digital still camera 1 shoots the object in the first operation mode, in which the vertical CCD drive timing signal HD is made in synchronism with the electronic shutter timing signal SUB. Shooting the object in the first operation mode, the digital still camera 1 can obtain effective data with the pixel value of CCD 33 unsaturated, displaying a live image of the data on the liquid crystal displaying unit 19.

Meanwhile, when it is determined at step S3 that the brightness of the object is lower than the first threshold level (NO at step S3), the controlling unit 42 sets the second operation mode at step S9. In the second operation mode, the electronic shutter operation is performed such that the generation frequency of the electronic shutter timing signal SUB to the horizontal CCD drive timing signal HD is reduced. Further, in the second operation mode, the generation frequency of the electronic shutter timing signal SUB to the horizontal CCD drive timing signal HD may be reduced only at the first stage. Further, in the second operation mode, the generation frequency of the electronic shutter timing signal SUB to the horizontal CCD drive timing signal HD may be reduced over plural stages depending on the brightness of the object to be shot. In the following description, in the case the brightness of the object is lower than the first threshold level and also is not lower than a second threshold level, the electronic shutter operation is performed in a first sub-mode, and in the case the brightness of the object is lower than the first threshold level and also is lower than the second threshold level, the electronic shutter operation is performed in a second sub-mode, whereby the generation frequency of the electronic shutter timing signal SUB is reduced over two stages in the second operation mode.

In the second operation mode, the controlling unit 42 judges at step S9 whether or not the brightness of the object is not lower than the second threshold level. The second threshold level is set to a value lower than the exposure value (EV) of the first threshold level. For instance, if the first threshold level is set to the exposure value of "11", the second threshold level will be set to a value of "8". When the brightness of the object is not lower than the second threshold level (YES at step S9), the controlling unit 42 advances to step S10. When the brightness of the object is lower than the second threshold level (NO at step S9), the controlling unit 42 advances to step S11. For example, the exposure value of "8" corresponds to the brightness of the object, which remains in a bright room. The exposure value is not restricted to the value of "8" but can be set to a value higher than "8" when the electronic shutter timing signal SUB is set to a lower generation frequency.

The controlling unit 42 outputs at step S10 the electronic shutter timing signal SUB once every time plural generation periods ("m" times) of the horizontal CCD drive timing signal HD have come in the first sub-mode of the second operation mode. More specifically, every time four generation periods (4 times) of the horizontal CCD drive timing signal HD have come, the controlling unit 42 generates the electronic shutter timing signal SUB once, as shown in FIG. 3. Thereafter, the controlling unit 42 performs processes at step S5 and at the following steps. In these processes, the digital still camera 1 generates the electronic shutter timing signal SUB at a period longer than the horizontal CCD drive timing signal HD during a period before starting the exposure time. Therefore, the controlling unit 42 drives CCD 33 in the electronic shutter operation less times in the second operation mode than in the first operation mode.

The controlling unit 42 outputs at step S11 the electronic shutter timing signal SUB once every time plural generation periods ("n" times) of the horizontal CCD drive timing signal HD have come in the second sub-mode of the second operation mode. More specifically, every time eight generation periods (8 times) of the horizontal CCD drive timing signal HD have come, the controlling unit 42 generates the electronic shutter timing signal SUB once, as shown in FIG. 4. Thereafter, the controlling unit 42 moves to the exposure time. The generation-cycle of the electronic shutter timing signal SUB shown in FIG. 4 is longer than the generation-cycle of the electronic shutter timing signal SUB shown in FIG. 3. "N" times at step S11 is larger than "m" times at step S10 (S11), which means that the brightness of the object is not higher than the second threshold level at step S9 and that the object remains in a dark place. When the object is shot in a dark place, charge would take a longer time to saturate in CCD 33 than a time the charge would take to saturate when the object is shot, whose brightness is higher than the second threshold level. The controlling unit 42 generates at step S11 the electronic shutter timing signal SUB at a longer generation period than the generation period at step S10. That is, the controlling unit 42 generates the electronic shutter timing signal SUB once every time the horizontal CCD drive timing signals have been generated "n" times.

As described above, in the first operation mode, the electronic shutter timing signal SUB is generated in synchronism with the horizontal CCD drive timing signal HD, but in the second operation mode, the electronic shutter timing signal SUB is generated once every time plural horizontal CCD drive timing signals HD have been generated. Therefore, the digital still camera 1 can reduce power consumption in the electronic shutter operation.

There are prepared the first sub-mode and the second sub-mode in the second operation mode of the digital still camera 1. The digital still camera 1 can further decrease the generation frequency of the electronic shutter timing signal SUB to the horizontal CCD drive timing signal HD depending on the brightness of the object, thereby reducing the power consumption in the electronic shutter operation.

After performing the process at step S11, the controlling unit 42 performs the processes at step S5 and at the following steps. In the period prior to the exposure time, the digital still camera 1 generates the electronic shutter timing signal SUB at a period longer than the horizontal CCD drive timing signal HD.

In the flow chart of the shooting operation shown in FIG. 5, the controlling unit 42 changes the generation frequency of the electronic shutter timing signal SUB to the frequency of the horizontal CCD drive timing signals HD in a stepwise manner, that is, the controlling unit 42 generates the electronic shutter timing signal SUB once every time "n" generation periods (step S11) or "m" generation periods (step S10) of the horizontal CCD drive timing signal HD have come. But the generation frequency of the electronic shutter timing signal SUB to the generation frequency of the horizontal CCD drive timing signal HD can be controlled more fine stepwise manner depending on the brightness of the object. The controlling unit 42 can generate the electronic shutter timing signal SUB when other number of horizontal CCD drive timing signals HD are generated.

Figure 7:
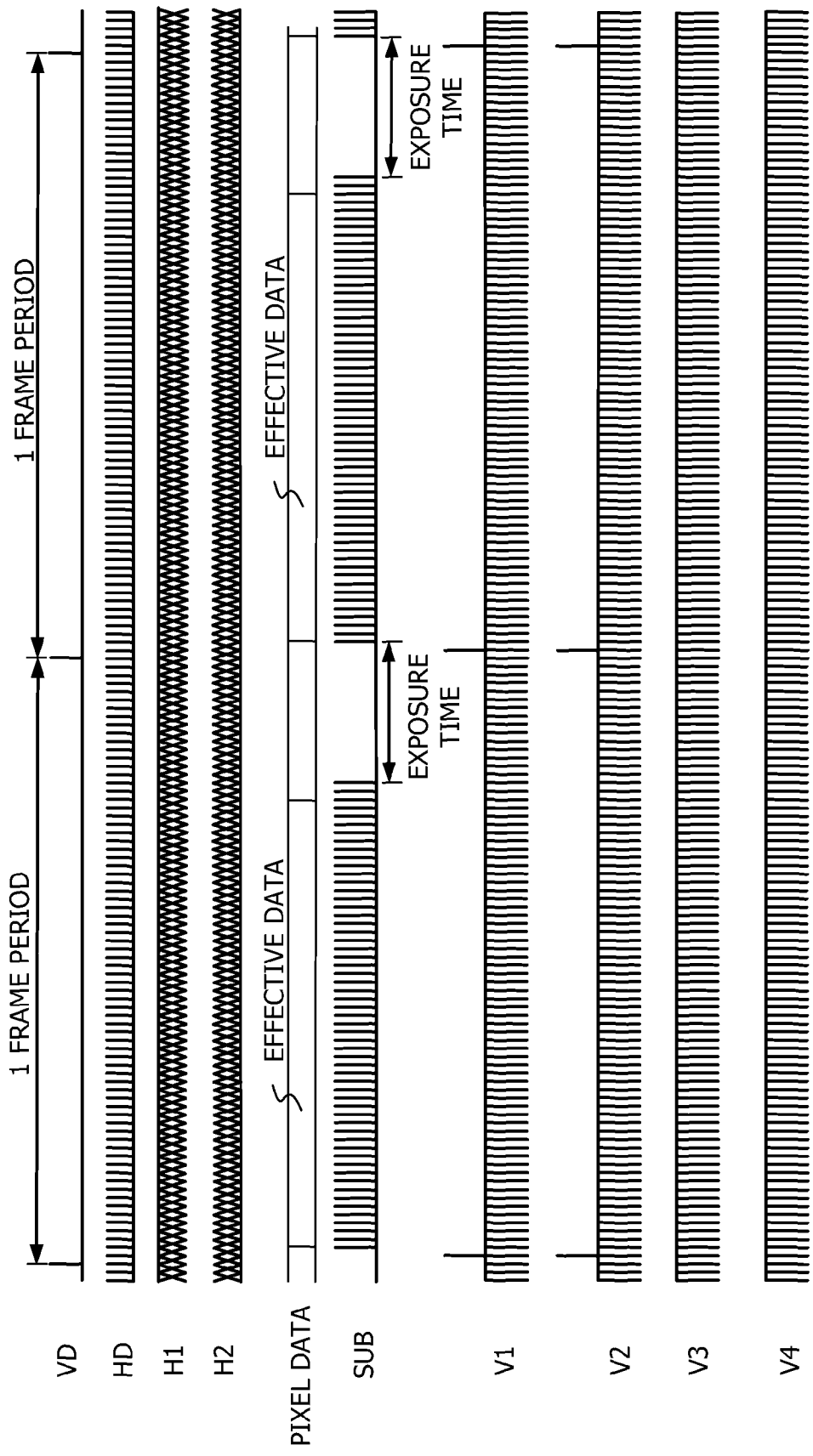
FIG. 7 is a time chart of another waveforms driving CCD in the digital still camera when the object is shot under high light condition.
Figure 8:
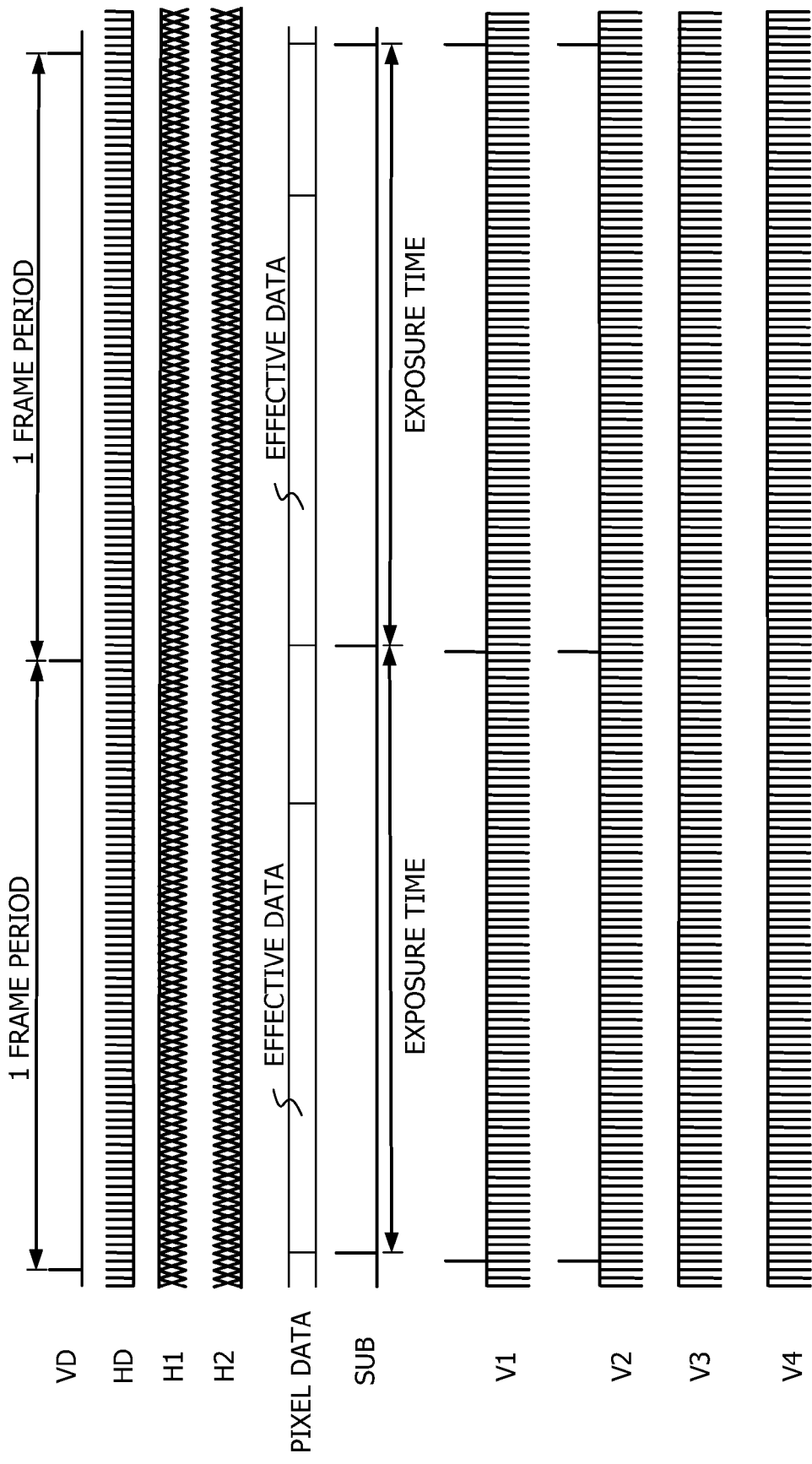
FIG. 8 is a time chart of another waveforms driving CCD in the digital still camera when the object is shot under low light condition.

FIGS. 7 and 8 are time charts of other waveforms driving CCD for comparison. FIG. 7 is a time chart of waveforms driving CCD 33 when the exposure time is made short in AE process. As shown in FIG. 7, even though the timing generator (TG) 34 generates the horizontal CCD drive timing signal HD at a short period, the electronic shutter timing signal SUB is generates in synchronism with the horizontal CCD drive timing signal HD regardless of the brightness of the object, and the electronic shutter is operated at the same timing as the horizontal CCD drive timing signal HD. In the digital still camera operating as shown in FIG. 7, since the electronic shutter timing signal SUB is generated at a higher frequency than the electronic shutter timing signal SUB generated in the second operation mode, a problem is caused that more power is consumed than in the second operation mode. But when the object is in a very dark place, or the brightness of the object is very low, the electronic shutter timing signal SUB is generated only once, as shown in FIG. 8. FIG. 8 is a time chart of waveforms driving CCD 33 when the object is shot under low light condition. In this case, the electronic shutter timing signal SUB is generated only once even in the second operation mode, and the power consumption is substantially equivalent.

The digital still camera 1 according to the embodiment of the invention has the first operation mode and the second operation mode, wherein in the first operation mode, a period of reading charge of one line from CCD 33 (period of the horizontal CCD drive timing signal HD) is synchronism with generation period of electronic shutter pulse signal (generation period of the electronic shutter timing signal SUB) and in the second operation mode, every time plural periods have come each for reading charge of one line from CCD 33, the electronic shutter pulse signal (electronic shutter timing signal SUB) is generated once. Since the digital still camera 1 has the second operation mode, the generation frequency of the electronic shutter timing signal SUB can be more reduced than in the first operation mode. When the second operation mode is selected, the power consumption in the electronic shutter operation can be reduced in the present digital still camera 1.

The digital still camera 1 measures the brightness of the object, and selects the first operation mode when the brightness of the object is not lower than the first threshold level and selects the second operation mode when the brightness of the object is not higher than the first threshold level. Therefore, the digital still camera 1 selects the second operation mode, when the brightness of the object is not so high, reducing the power consumption in the electronic shutter operation.

In the digital still camera 1, when the brightness of the object is not lower than the second threshold level, the controlling unit 42 generates the electronic shutter timing signal SUB (or electronic shutter pulse signal) once every time a first predetermined number ("m") of reading periods have come, wherein in each reading period, charge of one line is read from CCD 33, and when the brightness of the object is lower than the second threshold level, the controlling unit 42 generates the electronic shutter timing signal SUB (or electronic shutter pulse signal) once every time a second predetermined number ("n") of reading periods have come, wherein "n">"m". As the brightness of the object is lower, a period of the electronic shutter operation is made longer, whereby the power consumption is more efficiently reduced in the electronic shutter operation.

A modification may be made to the operation of the digital still camera 1 shown in FIG. 5, such that the processes of steps S3, S4, S9, S10 and S11 may be performed only between step S6 and step S7. In the modification, the digital still camera 1 can reduce the power consumption in the electronic shutter operation when an image is shot in response to operation of the shutter key 9 by the user.

Further, another modification may be made to the operation of the digital still camera 1 shown in FIG. 5, such that the processes of steps S3, S4, S9, S10 and S11 may be performed after step S2 and between step S6 and step S7. In the present modification, the digital camera 1 can reduce the power consumption in the electronic shutter operation while a live image is displayed and also reduce the power consumption in the electronic shutter operation when an image is shot in response to operation of the shutter key 9.

Although specific embodiments of the present invention have been described in the foregoing detailed description, it will be understood that the invention is not limited to the particular embodiments described herein, and that numerous rearrangements, modifications, and substitutions may be made to the embodiments of the invention and fall within the scope of the invention.

What is claimed is:

1. An image pick-up apparatus comprising:
   an image pick-up element for picking up an image, an exposure amount to the image pick-up element being controlled by an electronic shutter operation;
   a driving signal generating unit for generating an electronic shutter pulse signal for driving the image pick-up element;
   a controlling unit for controlling the driving signal generating unit; and
   a judging unit for judging brightness of an object to be shot;
   wherein the controlling unit controls the driving signal generating unit such that a first operation mode is set when the judging unit determines that the brightness of the object is not lower than a first threshold level and a second operation mode is set when the judging unit determines that the brightness of the object is lower than the first threshold level; and
   wherein in the first operation mode, a period for reading charge of one line from the image pick-up element is in synchronism with a generation period of the electronic shutter pulse signal and in the second operation mode, the electronic shutter pulse signal is generated once every time plural periods have come each for reading charge of one line from the image pick-up element.

2. The image pick-up apparatus according to claim 1, wherein the controlling unit controls the driving signal generating unit such that when the judging unit determines that the brightness of the object is lower than the first threshold level and is not lower than a second threshold level, the electronic shutter pulse signal is generated once every time a first predetermined number of periods have come each for reading charge of one line from the image pick-up element, and when the judging unit determines that the brightness of the object is not lower than the second threshold level, the electronic shutter pulse signal is generated once every time a second predetermined number of periods have come each for reading charge of one line from the image pick-up element, wherein the second predetermined number is larger than the first predetermined number.

3. An image pick-up apparatus comprising:
   an image pick-up element for picking up an image, an exposure amount to the image pick-up element being controlled by an electronic shutter operation;
   a driving signal generating unit for generating an electronic shutter pulse signal for driving the image pick-up element;
   a controlling unit for controlling the driving signal generating unit, wherein the controlling unit controls the driving signal generating unit to generate an electronic shutter pulse signal once every time plural periods, each for reading charge of one line from the image pick-up element, have come; and
   an exposure value obtaining unit for obtaining a current exposure value;
   wherein the controlling unit changes, depending on the exposure value obtained by the exposure value obtaining unit, a number of periods each for reading charge of one line from the image pick-up element to generate the electronic shutter pulse signal once.

4. The image pick-up apparatus according to claim 3, further comprising a setting unit for setting a relationship between the exposure value and the number of periods each for reading charge of one line from the image pick-up element.

5. A non-transitory computer readable recording medium mounted on an image pick-up apparatus, wherein the image pick-up apparatus is provided with a built-in computer and an image pick-up element, an exposure amount to which is controlled by an electronic shutter operation, the recording medium having recorded thereon a program which is executable by the built-in computer to perform functions comprising:
   generating electronic shutter pulse signals to drive the image pick-up element, such that when brightness of an object to be shot is judged to be not lower than a first threshold level, a period for reading charge of one line from the image pick-up element is made in synchronism with a generation period of the electronic shutter pulse signal, and when the brightness of the object is judged to be lower than the first threshold level, the electronic shutter pulse signal is generated once every time plural periods have come each for reading charge of one line from the image pick-up element.

6. A non-transitory computer readable recording medium mounted on an image pick-up apparatus, wherein the image pick-up apparatus is provided with a built-in computer and an image pick-up element, an exposure amount to which is controlled by an electronic shutter operation, the recording medium having recorded thereon a program which is executable by the built-in computer to perform functions comprising:
   generating electronic shutter pulse signals to drive the image pick-up element, such that an electronic shutter pulse signal is generated once every time plural periods, each for reading charge of one line from the image pick-up element, have come;
   wherein a number of periods each for reading charge of one line from the image pick-up element is changed depending on an obtained current exposure value to generate the electronic shutter pulse signal once.

7. A method for picking up an object by an image pick-up apparatus, wherein the image pick-up apparatus is provided with an image pick-up element for picking up an image, an exposure amount to the image pick-up element being controlled by an electronic shutter operation, and a driving signal generating unit for generating an electronic shutter pulse signal for driving the image pick-up element, the method comprising:
   judging a brightness of an object to be shot; and
   controlling the driving signal generating unit such that a first operation mode is set when it is judged that the brightness of the object is not lower than a first threshold level and a second operation mode is set when it is judged that the brightness of the object is lower than the first threshold level;
   wherein in the first operation mode, a period for reading charge of one line from the image pick-up element is in synchronism with a generation period of the electronic shutter pulse signal and in the second operation mode, the electronic shutter pulse signal is generated once every time plural periods have come each for reading charge of one line from the image pick-up element.

8. A method for picking up an object by an image pick-up apparatus, wherein the image pick-up apparatus is provided with an image pick-up element for picking up an image, an exposure amount to the image pick-up element being controlled by an electronic shutter operation, and a driving signal generating unit for generating an electronic shutter pulse signal for driving the image pick-up element, the method comprising:
   controlling the driving signal generating unit to generate the electronic shutter pulse signal once every time plural periods, each for reading charge of one line from the image pick-up element, have come;
   obtaining a current exposure value; and
   changing, depending on the obtained current exposure value, a number of periods each for reading charge of one line from the image pick-up element to generate the electronic shutter pulse signal once.

* * * * *